April 9, 1963     E. F. HARRETT     3,084,967
METHOD AND APPARATUS FOR REMOVING FRUIT FROM TREES
Filed Aug. 8, 1960     3 Sheets-Sheet 1
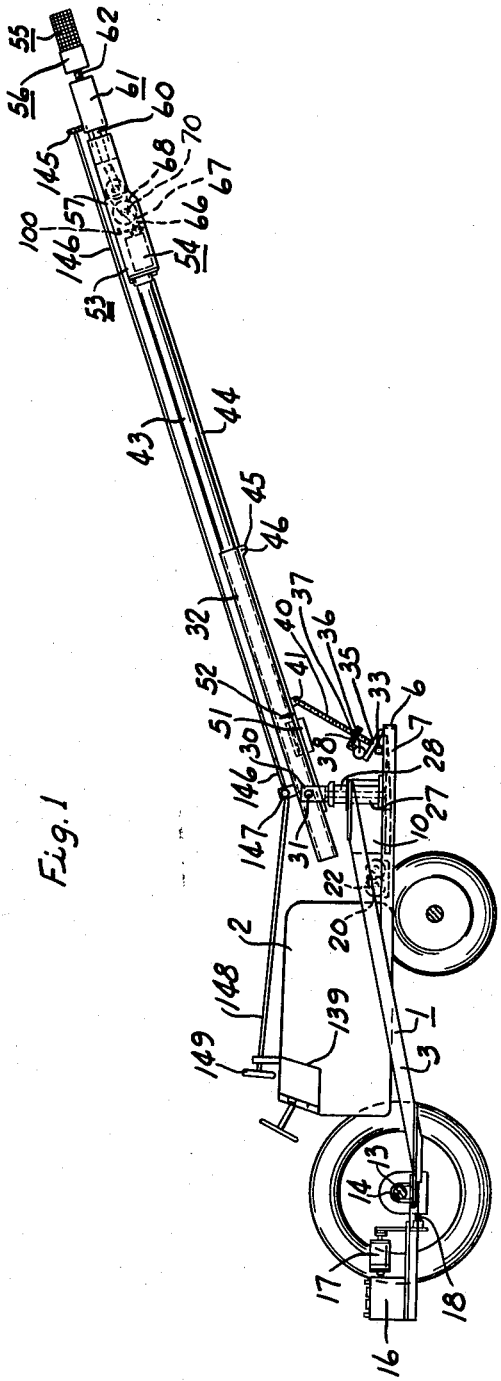
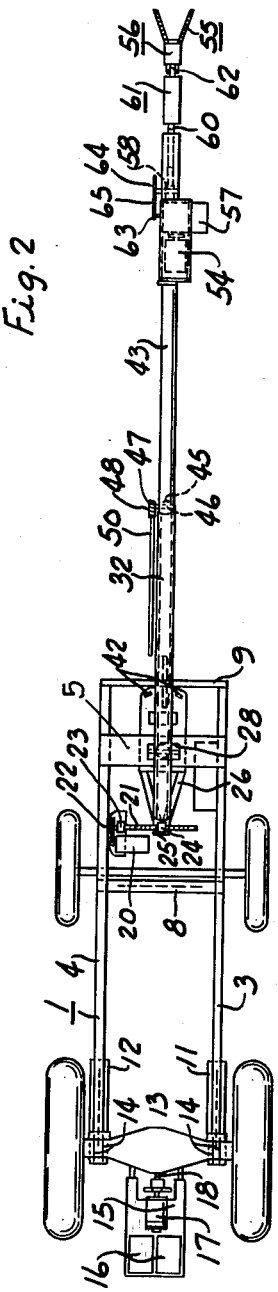
INVENTOR.
ERNEST F. HARRETT
BY
*William D. Carothers*
HIS ATTORNEY April 9, 1963  E. F. HARRETT  3,084,967
METHOD AND APPARATUS FOR REMOVING FRUIT FROM TREES
Filed Aug. 8, 1960  3 Sheets-Sheet 2
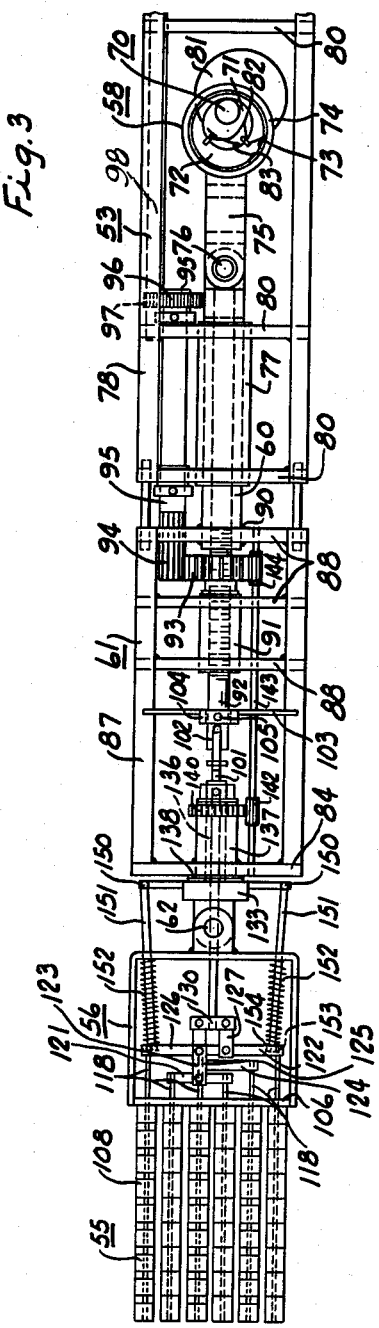
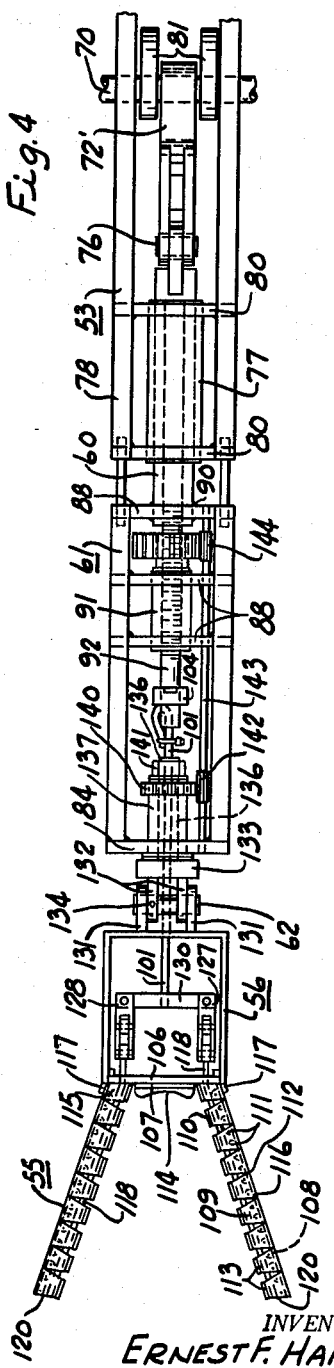
INVENTOR.
ERNEST F. HARRETT
BY
William D. Carothers
HIS ATTORNEY April 9, 1963     E. F. HARRETT     3,084,967
METHOD AND APPARATUS FOR REMOVING FRUIT FROM TREES
Filed Aug. 8, 1960     3 Sheets-Sheet 3

INVENTOR.
ERNEST F. HARRETT
BY William D. Carothers
HIS ATTORNEY

3,084,967
METHOD AND APPARATUS FOR REMOVING FRUIT FROM TREES
Ernest F. Harrett, Kewadin, Mich.
Filed Aug. 8, 1960, Ser. No. 48,215
6 Claims. (Cl. 294—86)

This invention relates generally to a method and apparatus for removing fruit from trees and more particularly to a method and apparatus for reciprocating trees or principal branches thereof with a push-pull movement to flex the fruit stems while the fruit remains substantially stationary to rupture the fibers of the abscission layer between the stem and the fruit causing the latter to fall.

The removal of fruit from the tree may be for the purpose of thinning the crop of fruit on the tree materially prior to maturity.

Fruit may be removed from trees just prior to maturity to remove the spoiled or unseasonable ripened fruit prior to the harvest.

The last and most important process of removing fruit from the trees is for the process of harvesting the fruit from the trees at which time the fruit is ordinarily caught in some form of net or canvas spread by means of a frame to catch the fruit and collect the fruit.

In order to properly selectively remove the desired fruit at the proper time it is necessary for one to be enabled to vary the amplitude of the reciprocating device attached to the tree or main branch or limb and properly reciprocate it at a speed that is effective to do the specific job intended that is, thin the fruit, eliminate the bad fruit, or harvest the fruit. Thus the natural period of vibration of the tree limb or branch and engaging means for reciprocation must be reciprocated at the desired period and at the proper amplitude to effect the proper separation of the selected fruit.

The principal object of this invention is the provision for a method and apparatus for determining the natural period of vibration of the tree limb or branch and to vary the reciprocation until the period of reciprocation approaches the natural period of vibration of the object being vibrated but not in synchronism with the natural period of the tree limb or branch, as such a resonant condition permits the tree limb or branch to whip with an uncontrolled action thereby preventing the proper selection of fruit removal. If the reciprocation is synchronized with the natural period of the object being vibrated such as a tree limb or branch, the latter may whip itself to destruction. In view of the fact that the tree limb or branch tapers the very flexible end thereof is apt to whip the fruit violently if reciprocated in synchronism with its natural period.

Another object of this invention is the method of removing fruit from a tree by selectively reciprocating a tree or parts thereof at an amplitude approximating the length of the stem of the fruit and at a period or frequency that allows the fruit to remain substantially stationary while the stem flexes back and forth relative to the fruit to rupture the fibers at the abscission layer between the stem and the fruit causing the latter to fall. If the fruit is selected for removal because it is undesirable and is substantially the same size and weight as the fruit to be harvested, then the frequency of reciprocation of the tree limb or branch is chosen to permit the fruit to remain stationary and the amplitude of reciprocation is less than that required for harvesting but is sufficient to flex the stem relative to the fruit and that fruit which is injured will be separated at the abscission layer while the healthy fruit remains. Thus it is important to be enabled in carrying out the foregoing method to not only vary the frequency of reciprocation but also vary the amplitude of the reciprocation which comprises an important object of this invention.

Another object of this invention is the provision of a hand having a plurality of fingers which when flexed will encompass and firmly grasp the object to be reciprocated. Although the fingers of this hand clamp may embrace different portions of irregularity of the tree limb or branch it will tighten with equal degree so as to prevent movement between the hand that is reciprocated and the object which it grasps and grips.

Another object is the provision of a hand provided with contractible and extendable fingers for grasping an object therebetween which hand is pivotally supported on the end of an arm and is controlled for rotary movement relative to the arm regardless of its pivotal position and is biased to return to its normal position on the pivot when the fingers are not holding anything in their grasp.

Another object is the provision of a hand having contractible and extendable fingers and provided with a recessed palm between the fingers for seating the object to be grasped by the fingers.

Another object is the provision of pads on the constractible and extendable fingers of a hand which pads have appropriate surface characteristics for handling a specific workpiece.

Another object is the provision of a mechanical hand having a plurality of fingers which are extensible and retractable and include an equalizing means equalizing the clamping pressure of each of the fingers, a power means which exerts limited power to the actuating force of the fingers and retains the same until released.

Another object is the provision of a tree reciprocator including a boom supported from a pivot constructed for mounting on a mobile body and carrying adjacent the outer end of the boom a reciprocating pitman driven by a rotary crank for the tree engaging member on the end of the pitman. The rotary crank and pitman being at the end of a boom provides reciprocating power ineffective on the mobile body.

Another object is the provision of a reciprocating tree engaging means mounted adjacent the outer end of a boom to locate the reciprocal mass beyond the center weight of the boom.

Another object is the provision of a boom carrying a reciprocating device adjacent its outer end for removing fruit from a tree and having power means to extend and contract the boom to vary the position of the reciprocating mechanism on the end of the boom.

Another object is the provision of a counterweight crank for reciprocating a tree to remove fruit therefrom which counterweight lags the crank from 90° to 135°.

Other objects and advantages appear hereinafter in the following description and claims.

The accompanying drawings show for the purpose of exemplification without limiting this invention or the claims thereto, certain practical embodiments illustrating the principles of this invention wherein:

FIG. 1 is a view in side elevation of the fruit removing apparatus comprising this invention as applied to a tractor.

FIG. 2 is a plan view of the structure shown in FIG. 1.

FIG. 3 is an enlarged view in side elevation showing a tree grasping hand and its reciprocating mechanism on the outer end of the boom.

FIG. 4 shows a slightly modified mechanism and is taken as a plan view of the structure shown in FIG. 3.

Figure 5:
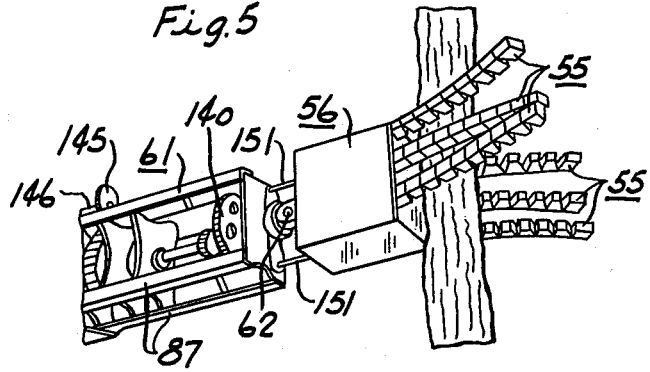
FIG. 5 is a perspective view of the hand mechanism and its operating structure.

Referring to FIGS. 1 and 2 of the drawings the apparatus for removing fruit from trees comprises the chassis frame 1 mounted on the tractor 2, the chassis frame comprising the parallel rail members 3 and 4 connected in the front by the cross platform 5, the rail members 3 and 4 being disposed at an angle relative to the tractor 2 and having an under forward frame 6 formed by two parallel rail members 7 connected to the rail members 3 and 4 at their rear end joined by the cross members 8 and 9. Each of the rail members 7 are connected by the vertically disposed plate members 10 to their corresponding side rails 3 and 4.

The rear ends of the rails 3 and 4 of frame 1 are provided with the horizontally disposed plate members 11 and 12 which are secured to the rear axle housing 13 of the tractor by the U-bolts 14 which plates extend rearwardly to form a battery platform 15 to carry the batteries 16 together with the generator 17 operated through the power take off 18 of the tractor 2. The batteries 16 are preferably connected to supply twenty-four volts to some of the apparatus. The lower frame formed by the rails 7 supports the traverse motor 20 which drives the screw member 21 through the gear train 22. The screw member 21 is supported by the bearing 23 adjacent the gear train and its outer end extends through the swivelly supported nut 24 in the tailpiece 25 and the rotary platform 26. The platform 26 carries the standard 27 and carries the kingpin 28 provided with spaced trunion bearings 30 to receive the trunnions 31 on opposite sides of the boom 32. Thus when the motor 20 is rotated in either direction the screw 21 moves the platform 26 about the kingpin 28 to swing the boom 32 in an arc of approximately forty degrees. In view of the mobility of the tractor it is unnecessary to require a greater swing movement of the boom 32.

The forward portion of the lower platform is provided with the horizontal pivot member 33 that carries the upwardly extending stem on which is mounted a platform 35 for carrying the boom elevating motor 36 that operates the worm 37 which drives the worm gear 38 that is internally threaded to raise and lower the screw member 40, the upper end of which is pivotally connected to the boom as indicated at 41. Thus by rotating the motor 36 in opposite directions the boom 32 may be raised and lowered on the pivot 31 and since the horizontal pivot member 33 is mounted on the platform 26 the boom elevating mechanism travels as the boom swings. To support this elevating mechanism a pair of spaced outboard rollers 42 are provided on the platform 26 to transmit the additional load weight of the boom 32 to the frame 1.

The boom 32 is a hollow tube and has telescoped therein the boom extension member 43 the under side of which is provided with the rack 44 that engages the pinion 45 on the outer end of the boom section 32. The pinion 45 is supported on the shaft 46 the outer end of which is provided with the worm gear 47 to be engaged by the worm 48 on the shaft 50 which is rotated by the boom extension motor 51 through the gear train 52 on the side of the boom section 32. Thus by operating the motor 51 in opposite directions the inert telescoping boom section 43 may be extended or retracted in the boom section 32 to substantially the same length as the boom section 32.

The boom sections 32 and 43 being tubular and hollow provide a convenient means for carrying the cable for controlling the reciprocating mechanism supported at the outer end of the boom section 43 together with the controls thereof.

The outer end of the boom section 43 is provided with a boom extension 53 for the purpose of housing the motor 54 for retracting and extending the fingers 55 of the hand 56 at the outermost end of the boom. The extension 53 also encloses the motor 57 which actuates the vibratory member 58 for the purpose of reciprocating the hand 56 through the pitman 60 which reciprocates the forearm 61 that carries the clamp actuating device for the fingers 55 and actuated by the motor 54.

The hand 56 is pivotally supported on the end of the forearm 61 by means of the horizontally disposed pivotal member 62 which is also rotatably supported by the forearm 61.

As shown in FIG. 2 the shaft of the motor 57 is provided with a pinion 63 for the purpose of driving the gear 64 through the chain 65 in operating the vibratory mechanism 58.

Referring to FIGS. 3, 4 and 5 the boom extension 53 which houses the motors for retracting and extending the fingers 55 and the vibratory motor 57 require a larger space than that necessary for the boom section 43 and thus the boom extension 53 is necessarily larger. The vibratory motor 57 is provided with a sprocket 66 which actuates the chain 67 which encircles the gear 68 for driving the crank shaft 70 of the vibratory mechanism 58. The crank shaft 70 is journaled in suitable bearings and has connected thereto the eccentric wheel 71 which is adjustably detached to the outer eccentric wheel 72 which in turn is provided with a bearing 73 to support the connecting rod strap member 74 secured to the connecting rod 75 the opposite end of which is pivoted as at 76 to the inner end of the pitman 60. The pitman 60 is preferably cylindrical but may be of nonround cross section and it rides in the tubular bearing member 77 which has a bore to fit the perimetral surface of the pitman 60. The boom extension is constructed of four angle members 78 that are connected by the transverse plates 80 which in turn support the shaft 70 and the tubular bearing 77 having a bore to conform to the perimetral shape of the pitman 60. The tubular bearing 77 is provided with a sufficient length to support the forearm 61 and hand 56 which extend beyond the boom extension 53.

The outer eccentric 72 has secured thereto the eccentric weight members 81 and when the inner eccentric 71 is adjustably secured by the clamp members 82 to the eccentric 72 as shown in FIG. 3 the crank is at its maximum throw. Since the eccentric 71 is circular and fits within a circular recess 83 of the eccentric 72 the clamps 82 may be adjusted to connect these eccentric members at different relative positions to vary the length of the crank arm from the maximum as shown to a minimum which is substantially zero. Since the eccentric weight 81 is secured relative to the eccentric 72 it stays at the same relative position to the crank.

Figure 6:
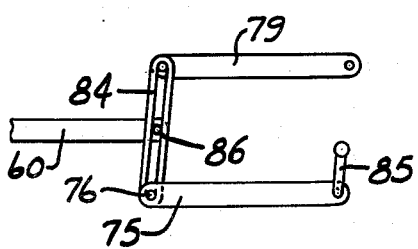
FIG. 6 is an enlarged detail view of a modified form of the vibratory motor providing variable amplitude.

As shown in FIG. 6 one may vary the pitman stroke by means of a floating rocker arm 84 which is pivotally supported at one end by the pivot link 79 and has pivotally connected at its other end the connecting rod 75 which in turn is driven by the fixed crank 85. To vary the throw of the pitman 60 one merely adjusts the relative position of the pivotal point 86 between the rocker arm 84 and the pitman 60. In this manner the pitman 60 is moved relative to the connecting rod 75.

Thus by changing either the position of the pivot 86 on rocker arm 84 as shown in FIG. 6 or by use of the double eccentrics 71, 72 shown in FIG. 3 one may change the amplitude of reciprocation of the vibratory mechanism 58.

The vibratory motor of FIG. 4 is different than that of FIG. 3 in that the eccentrics 71 and 72 are made as a single eccentric 72' and the counterweights 81 are two in number one on each side of the eccentric and secured to the shaft 70. This eccentric 72' not being adjustable provides a fixed amplitude of reciprocation.

The amplitude of vibration of the hand is preferably from three-quarters of an inch to two inches. Two of the ideal settings for the amplitude would be an inch and an inch and a half for fruit such as cherries. However with these mechanisms one may readily vary the amplitude to suit the different conditions required.

The speed of rotation of the crank arm 70 determines the frequency of reciprocation of the hand which may be varied by varying the speed of the motor 57. The structure shown employs a D.C. motor at 57 which supplies approximately eight horsepower and the speed of which may be varied to drive the crank in increments from five hundred to twelve hundred revolutions per minute which increments are determined by insertion in the circuit of the motor 57 of predetermined resistances in combination with the variable resistance to provide a uniform change of speed from one limit to the other. Thus by providing a variable amplitude and a variable frequency of reciprocation one is enabled to properly reciprocate the hand when secured to a tree branch or limb so that the natural period of the movable parts may be readily determined by observation of the tachometer which informs the operator of the frequency of vibration and the reaction of this vibration on the fruit. In this manner the tree limb or branch may be reciprocated to flex the stems of the fruit while the fruit itself remains substantially motionless to permit a fracture of the fibers in the abscission layer between the stem and the fruit causing a rupture of the layer and the separation of the fruit from the stem and the fruit will drop vertically without transverse motion to enable it to be caught and directed to a central gathering means. Thus by observing the action of the branch, limb or tree and the movement of the fruit one may properly adjust the operation of the vibratory device 58 to produce the result desired in flexing the stems relative to the fruit and causing the latter to fall.

The outer end of the pitman 60 is secured to the forearm 61 which in this instance is constructed as a rectangular frame having four parallel rails 87 preferably made of angle iron and similar to that of the boom extension 53 but slightly smaller in size so as to fit within the rails of the boom extension. It is preferable that the rails of the forearm are free from the rails of the boom extension to prevent any additional friction therebetween. The extension of the rails of the boom extension close over the forearm merely to protect the latter from external interference.

The quadrangularly disposed rails 87 of the forearm 61 are connected by the transverse plates 88 of which there are four shown and the innermost plate 88 is welded as indicated at 90 to the outer end of the pitman 60.

The next two transverse plates 88 support a sleeve 91 which is bored to slidably receive the threaded stem member 92 which extends through the sleeve 91 into the bore of the pitman 60. Intermediate of the end of the pitman 60 and the second transverse plate 88 a gear 93 having a threaded bore to fit the stem 92 is mounted on the latter for rotation. The gear 93 meshes with the pinion 94 which is of considerable length to permit the gear 93 and the pinion 94 to maintain its proper meshed position during the reciprocation of the pitman 60. The pinion 94 is on the end of the shaft 95 journaled in the transverse plates 80 in the boom extension 53 and the opposite end of the shaft 95 is provided with a gear 96 which meshes with the pinion 97 on the shaft 98 the opposite end of which is connected through the gear train 100 to the reversible motor 54 in the boom extension 53. Thus by reversing the motor 54 one may run the threaded screw 92 in and out relative to the pitman and forearm for the purpose of operating the fingers 55.

The threaded screw 92 is journaled for longitudinal movement in the bushing 91 but it is desirable to be able to rotate this screw for the insertion of the cable 101 in the outer end of the screw wherein the cable is fastened as indicated at 102. To prevent the screw from rotating a spider member 103 having a collar 104 fitting over the screw 92 is provided with the set screw 105. The opposite ends of the spider 103 ride in the opposed angles forming the forearm 61 which angles are quadrangularly arranged and indicated at 87. Thus when the set screw 105 is fixed in the screw 92 the spider 103 may move inwardly and outwardly but prevents the screw 92 from rotating.

Figure 8:
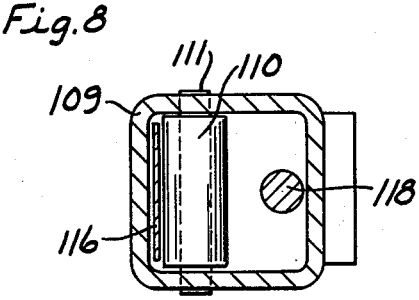
FIG. 8 is an enlarged view of a cross section of the finger.

The hand 56 is a square box member open at one end to receive the plate member 106 which carries the palm 107 of the hand. The plate 106 has two opposed rows of fingers 108 each row of fingers being made up of a series of hollow segments 109 which are shown in cross section in FIG. 8 wherein each segment is tapered at each end or they are held spaced apart by a long link which pivotally joins its segments together when the segments are truncated as indicated in FIG. 4. The connecting links 110 which are pivoted to adjacent segments by the pins 111 may be relatively short permitting the back of the segments to almost touch each other as indicated at 112 when the finger is bent backwardly. Rather than using a hollow or tubular segment one could employ a form of chain wherein the connecting links and the adjacent segments are one and the same.

The inner face of each segment 109 is provided with a pad member 113. These pad members are preferably rubber when the device is employed to remove fruit from the trees and the palm 107 is likewise provided with the pad 114 made of rubber for the purpose of removing fruit from the trees. When however the device is employed for gathering and depositing logs or pipe the pads 114 may be changed to knurled steel surfaces or spiked or hob surfaces. Thus the pads may have appropriate surface characteristics for handling a specific workpiece.

The inner end of each finger is provided with a stationary hollow segment 115 which is secured to the face of the plate 106 and is disposed outwardly relative to the palm so that the fingers when extended are substantially straight and form an open V as illustrated in FIG. 4.

Each finger has a spring steel strap 116 that is secured to the innermost and nonmovable segment 115 as by the bolt 117. The spring 116 then extends through each of the segments to its termination at the outer end of the last segment and is freely slidable between the links 110 and the outer wall of the hollow segment 109. The inner portion of the segments of each finger is provided with a cable 118 which is secured at 120 to the outermost segment of each finger and extends inwardly through each of the segments in series and passes through a beveled opening in the plate 106 to where it is fastened to a combination of singletrees and doubletrees. As shown in FIG. 3 of the drawings the uppermost finger is the top finger of a series of three that appear on the right hand side of FIG. 4 and they face upwardly on the drawing where each alternate finger is on the left hand side of FIG. 4 and the back of these fingers are shown as the alternate fingers. Referring specifically to FIG. 3 the set of fingers have their backs to the viewer, have their cables 118 connected to opposite ends of the singletree 121 and the lowermost finger has its cable 118 connected to one end of the doubletree 122. The center of the singletree is provided with a pivoted strap 123 that connects to the opposite end of the doubletree 122.

The opposite set of which their face is shown in FIG. 3 has their two lowermost cables 118 connected to opposite ends of the singletree 124 and the pivot 125 from the center of the singletree extends to one end of the doubletree 126 the other end being connected to the cable 118 of the topmost finger.

Figure 7:
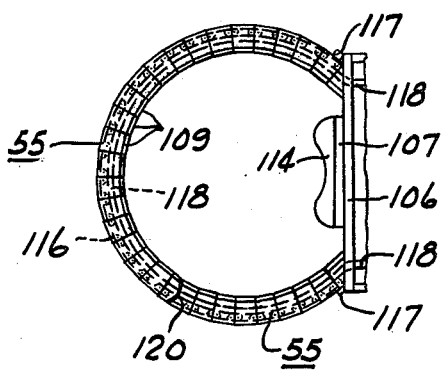
FIG. 7 is an enlarged view of a finger contracted.

As shown in FIG. 3 each of the doubletrees 122 and 126 are provided with pivotal members 127 and 128 which connect the opposite ends of the doubletree 130 and the center of the doubletree 130 is connected to the cable member 101 which extends through the pivotal member or pin 62 and rearwardly to where it is connected as indicated at 102 to the threaded stem 92. Thus when the stem 92 is drawn rearwardly the tension is placed on the doubletree 130 and through the system of the two singletrees and the doubletree of each set of fingers the cables are drawn inwardly into the hand like tendons to cause the fingers to curl and wrap themselves around the object or workpiece to be grasped clamping the same tightly against the pad 114 on the arcuate palm 107. When the fingers are curled and clamped on a member in the manner described they appear as shown in FIG. 7.

The rear face of the box or hand 56 is provided with a pair of ears 131 which have aligned openings to receive the pivot member or pin 62. This pivot member also extends through aligned openings in the spaced ears 132 which are inwardly spaced from the ears 131 and are secured relative to the collar 133. A set screw 134 fixes the pivot pin 62 relative to the ears 132 and the collar 133 and as shown in FIG. 3 the pin 62 has a passage therethrough to admit the cable therethrough which passage is bell-shaped towards the hand to permit the latter to pivot or hinge on the axis of the pin 62. The bell-shaped opening terminating at the center of the pin which represents the axis as illustrated in FIG. 3.

The collar 133 is provided with a rearwardly extending sleeve 136 journaled in the sleeve bearing 137 that is welded to the outer end of the forearm 61. Spacer washers 138 are placed between the end of the forearm and the collar 133. The opposite end of the sleeve 136 has secured thereto the gear 140 which is held on the sleeve by means of the nut 141. The gear 140 meshes with the pinion 142 on the shaft 143 journaled in the plates 84 and 88 on the forearm. The rear end of the shaft 143 has an extensible pinion 144 which meshes with a gear 145 in FIG. 1 on the outer end of the shaft 146 which extends down the boom and is provided with a splined joint to compensate for the expansion and contraction of the boom section 43 and travels to a universal joint 147 above the pivot of the boom from whence the shaft 148 extends to the hand wheel 149 adjacent the steering wheel and controls on the tractor 2. Thus one operating the mechanism and sitting at the control station 139 on the tractor is enabled to rotate the hand wheel 149 and thus rotate the hand 56 relative to the forearm 61 to turn the hand at a proper position for engagement with the object to be clasped by the fingers 55.

The collar 133 is provided with a pair of oppositely extending arms 150 which have pivotally secured thereto the rods 151 that extend outwardly through openings in the hollow box type hand 56 for the purpose of receiving the springs 152. The springs 152 are held on the rods 151 by means of the nuts 153 and the washers 154. It will be noted that the arms 150 extend laterally from the collar 133 which represent an axis that is at right angles to the axis of the pin 62 and the opposed springs 152 must contract and expand when the hand is pivoted on the pin 62. Thus when the boom is extended toward a tree limb or branch with the fingers open as indicated in FIG. 4 and is rotated at the proper angle to accept the tree limb or branch but the boom is extending upwardly at an angle then the hand is permitted to engage the tree limb or branch and rock on the pivot 62 so as to fit the tree limb or branch within the palm 107 and the hand by swinging on the pin 62 and contracting the lower spring 152 while the upper spring is extended.

In order to hold the hand owing to the fact that it represents a predetermined weight it is necessary to either use a heavier top spring or adjust the springs 152 to compensate and thus provide for a slight tilt of the hand relative to the forearm when the boom is raised and approaches the tree limb or branch.

It is preferable to have stops to prevent the rotation of the hand beyond predetermined limits.

It is preferable to provide limit switches on the screw 92 for the purpose of limiting the extent of the travel inwardly and outwardly of the screw within the forearm. The inward limit may be controlled by a torque switch on the motor which when it delivers a predetermined amount of torque to close the fingers on the object being grasped the motor ceases to apply any more turning force on the screw 92 and the fingers grasp the object at a maximum pressure. This prevents injury of the tree limb or branch.

The extensible section of the boom 43 is also provided with limit switches to determine the inner and outermost positions to which the section 43 is permitted to telescope within the boom 32. Likewise the boom hoist motor 36 is limited in both directions of its travel by limit switches and the motor 20 is also limited in its swing of the platform 126 in both directions.

Any suitable motor may be employed at each of the motor stations. However, it is found to be preferable to employ direct current motors which can be readily governed as to speed of operation. The vibratory motor 57 is preferably an eight horsepower series wound motor of twenty-four volts which is the total voltage of the two batteries shown at 16. The motor 54 which operates the fingers 55 is preferably a one and one-half horsepower compound wound motor operated on twelve volts. The boom swing motor 20 is the same type of motor whereas the boom extension motor 51 and the boom lifting motor 26 are both two horsepower series wound twelve volt motors. By placing the boom extension motor 51 close to the pivot 31 one is enabled to reduce the suspended weight at the end of the boom section 32 and since the boom extension 53 carries only two motors 54 and 57 that limits the weight required to be continuously supported on the end of the boom. However, the distribution of the weight through the predetermined position of these motors on the boom, the frame and the boom extension permits proper reciprocation of the forearm 61 and the hand 56 without creating a material vibration on the boom itself or the tractor which is an important factor on this device.

In harvesting fruit such as cherries it is found best to employ an inch to an inch and one-half stroke at a speed of seven hundred and fifty to one thousand reciprocations per minute. By use of fixed resistance the series motor 57 may be rotated to deliver a crank shaft in six steps of from five hundred revolutions per minute to thirteen hundred revolutions per minute in delivering a one inch stroke to the hand 56. Each of the six steps formed by the fixed resistance will also be varied minutely by a variable resistance in the motor circuit. Thus by means of a tachometer which is connected to the motor 57 one may watch the operation of the tree to determine its period of vibration and then change the speed of the motor slightly to either side of this period for producing the proper flexing of the tree limbs or branches to flex the stems and permit the fruit which is standing still to drop straight to the gatherer. The tachometer 155 may be read directly by a meter at the control station thus one is enabled to determine when any size limb is reciprocating at a predetermined speed.

The weight of the tree portion undergoing movement from the oscillator, its center of mass, its weight, its moments of inertia, its vibration periods, its periods of resonance, the wave length of its nodes and anodes, constantly vary as the tree is relieved of its fruit, making speed changing during the operation of vibration a necessity to removal of all the fruit from a given tree portion. To meet these conditions a change of amplitude during operation is desirable.

I claim:

1. A gripping device for the end of a mechanical harvester boom comprising, in combination, a hand body having an outwardly facing palm, a first group of spaced flexible fingers mounted on said body at one side of said palm, a second group of spaced flexible fingers mounted on said body at the opposite side of said palm from said first group of fingers, and means for curling said fingers in parallel planes from outwardly extending positions to curved positions spanning said palm, said finger spacing permitting the fingers of said first group to interfit with the fingers of said second group.

2. A gripping device for the end of a mechanical harvester boom comprising, in combination, a hand body having an outwardly facing palm, a first group of spaced flexible fingers mounted on said body at one side of said palm, a second group of spaced flexible fingers mounted on said body at the opposite side of said palm from said first group of fingers, and means for curling said finger groups toward one another and back to said palm so as to embrace and draw generally cylindrical objects solidly against said palm.

3. A gripping device for the end of a mechanical harvester boom comprising, in combination, a support member adapted to be mounted on said boom end for rotation about the axis of the boom, a hand body pivotally mounted on said support member for rotation about an axis disposed generally at right angles to said boom axis, opposed gripping fingers mounted on opposite sides of said body, and means for actuating said fingers to securely grip generally cylindrical objects when such objects are disposed substantially at right angles to each of said axes.

4. A gripping device for the end of a mechanical harvester boom comprising, in combination, a support member adapted to be mounted on said boom end for rotation about the axis of the boom, means for adjustably rotating said support member about said boom axis, a hand body pivotally mounted on said support member for rotation about an axis disposed generally at right angles to said boom axis, means for resiliently holding said hand body against rotation about its pivotal mounting on said member with the hand body being generally alined with said boom axis, opposed gripping fingers mounted on opposite sides of said body, and means for actuating said fingers to securely grip generally cylindrical objects when such objects are disposed substantially at right angles to each of said axes.

5. A gripping device for the end of a mechanical harvester boom comprising, in combination, a support member adapted to be mounted on said boom end for rotation about the axis of the boom, a hand body having an outwardly facing palm and being pivotally mounted on said support member for rotation about an axis disposed generally at right angles to said boom axis, a first group of spaced flexible fingers mounted on said body at one side of said palm, a second group of spaced flexible fingers mounted on said body at the opposite side of said palm from said first group of fingers, and means for curling said fingers in parallel planes from outwardly extending positions to curved positions spanning said palm, said finger spacing permitting the fingers of said first group to interfit with the fingers of said second group.

6. A gripping device for the end of a mechanical harvester boom comprising, in combination, a hollow hand body having an outer palm surface, a first group of spaced flexible fingers mounted on said body at one side of said palm surface, a second group of spaced flexible fingers mounted on said body at the opposite side of said palm from the first group of said fingers, each of said fingers having an actuating cable extending into said hollow body and arranged to curl its respective finger over said palm surface upon tensioning of the cable, and a linkage including single tree and double tree members coupling all of said finger cables to a single main actuating member so that shifting of said member tensions each of said cables without jamming if one of said fingers is blocked from curling.

References Cited in the file of this patent

UNITED STATES PATENTS

| | | |
|---|---|---|
| 1,693,074 | Falco | Nov. 27, 1928 |
| 2,700,268 | Lowe | Jan. 25, 1955 |
| 2,828,998 | Seelye | Apr. 1, 1958 |
| 2,891,372 | Goodwin | June 23, 1959 |
| 2,910,321 | Sehn et al. | Oct. 27, 1959 |
| 3,020,695 | Gould et al. | Feb. 13, 1962 |